US008542206B2

(12) United States Patent
Westerman et al.

(10) Patent No.: US 8,542,206 B2
(45) Date of Patent: Sep. 24, 2013

(54) SWIPE GESTURES FOR TOUCH SCREEN KEYBOARDS

(75) Inventors: Wayne Carl Westerman, San Francisco, CA (US); Henri Lamiraux, San Carlos, CA (US); Matthew Evan Dreisbach, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 13/242,406

(22) Filed: Sep. 23, 2011

(65) Prior Publication Data

US 2012/0011462 A1    Jan. 12, 2012

Related U.S. Application Data

(62) Division of application No. 11/766,929, filed on Jun. 22, 2007.

(51) Int. Cl.
*G06F 3/041* (2006.01)
(52) U.S. Cl.
USPC ............... 345/173; 178/18.01; 178/20.01; 715/773
(58) Field of Classification Search
USPC ............... 345/173–178; 178/18.01–18.11; 715/255–835, 713
See application file for complete search history.

(56) References Cited

U.S. PATENT DOCUMENTS

| | | | |
|---|---|---|---|
| 5,488,204 A | 1/1996 | Mead et al. | |
| 5,491,495 A | 2/1996 | Ward et al. | |
| 5,880,411 A | 3/1999 | Gillespie et al. | |
| 6,094,197 A | 7/2000 | Buxton et al. | |
| 6,104,317 A | 8/2000 | Panagrossi | |
| 6,128,003 A | 10/2000 | Smith et al. | |
| 6,188,391 B1 | 2/2001 | Seely et al. | |
| 6,323,846 B1 | 11/2001 | Westerman et al. | |
| 7,057,607 B2 * | 6/2006 | Mayoraz et al. | 345/173 |
| 7,614,008 B2 | 11/2009 | Ording | |
| 7,706,616 B2 * | 4/2010 | Kristensson et al. | 382/187 |
| 2002/0015064 A1 | 2/2002 | Robotham et al. | |
| 2003/0048948 A1 * | 3/2003 | Confer et al. | 382/197 |
| 2003/0174125 A1 | 9/2003 | Torunoglu et al. | |
| 2005/0104867 A1 | 5/2005 | Westerman et al. | |
| 2006/0026521 A1 | 2/2006 | Hotelling et al. | |

(Continued)

OTHER PUBLICATIONS

Wobbrock et al., "Exploring Edge-Based Input Techniques for Handheld Text Entry," Multimedia Signal Processing, IEEE Workshop, Dec. 9-11, 2002, © 2003 IEEE, pp. 280-282.

(Continued)

*Primary Examiner* — Amare Mengistu
*Assistant Examiner* — Vinh Lam
(74) *Attorney, Agent, or Firm* — Morgan, Lewis & Bockius LLP

(57) ABSTRACT

Systems, methods, and devices for interpreting manual swipe gestures as input in connection with touch-sensitive user interfaces that include virtual keyboards are disclosed herein. These allow for a user entering text using the virtual keyboard to perform certain functions using swipes across the key area rather than tapping particular keys. For example, leftward, rightward, upward, and downward swipes can be assigned to inserting a space, backspacing, shifting (as for typing capital letters), and inserting a carriage return and/or new line. Various other mappings are also described. The described techniques can be used in conjunction with a variety of devices, including handheld devices that include touch-screen interfaces, such as desktop computers, tablet computers, notebook computers, handheld computers, personal digital assistants, media players, mobile telephones, and combinations thereof.

16 Claims, 14 Drawing Sheets

(56) References Cited

U.S. PATENT DOCUMENTS

| | | |
|---|---|---|
| 2006/0053387 A1 | 3/2006 | Ording |
| 2006/0055662 A1 | 3/2006 | Rimas-Ribikauskas et al. |
| 2006/0097991 A1 | 5/2006 | Hotelling et al. |
| 2006/0125803 A1 | 6/2006 | Westerman et al. |
| 2006/0197753 A1 | 9/2006 | Hotelling |
| 2006/0209014 A1 | 9/2006 | Duncan et al. |
| 2007/0220444 A1 | 9/2007 | Sunday et al. |
| 2008/0165142 A1* | 7/2008 | Kocienda et al. ............ 345/173 |
| 2008/0165148 A1* | 7/2008 | Williamson et al. .......... 345/173 |
| 2009/0058819 A1* | 3/2009 | Gioscia et al. ............... 345/173 |

OTHER PUBLICATIONS

International Search Report dated Apr. 7, 2009, received in International Application No. PCT/US2008/067396, which corresponds to U.S. Appl. No. 11/766,929, 3 pages (Westerman).

Office Action dated Nov. 3, 2010, received in U.S. Appl. No. 11/766,929, 15 pages (Westerman).

Final Office Action dated Feb. 24, 2011, received in U.S. Appl. No. 11/766,929, 14 pages (Westerman).

Notice of Allowance dated Aug. 18, 2011, received in U.S. Appl. No. 11/766,929, 9 pages (Westerman).

* cited by examiner

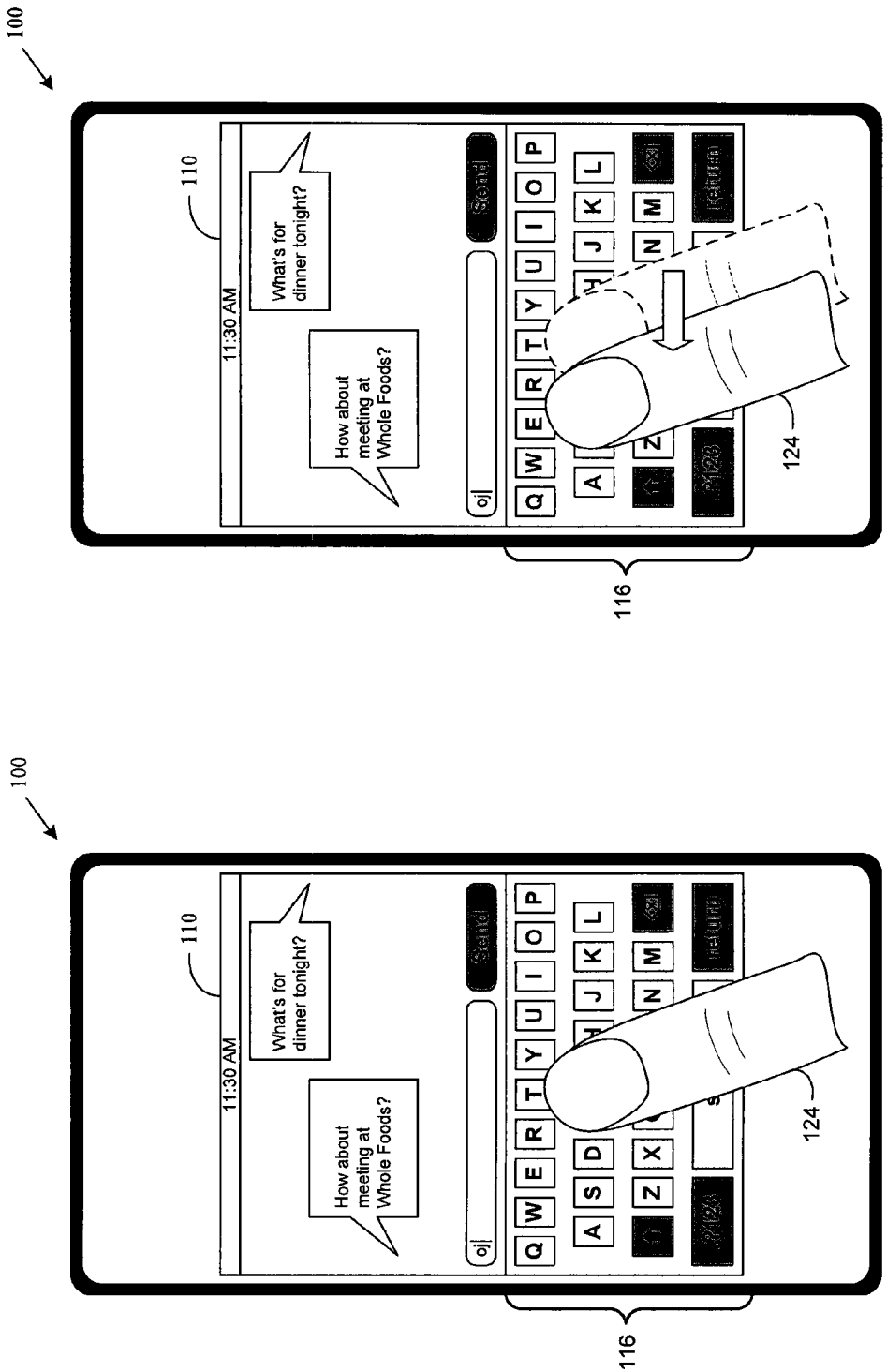

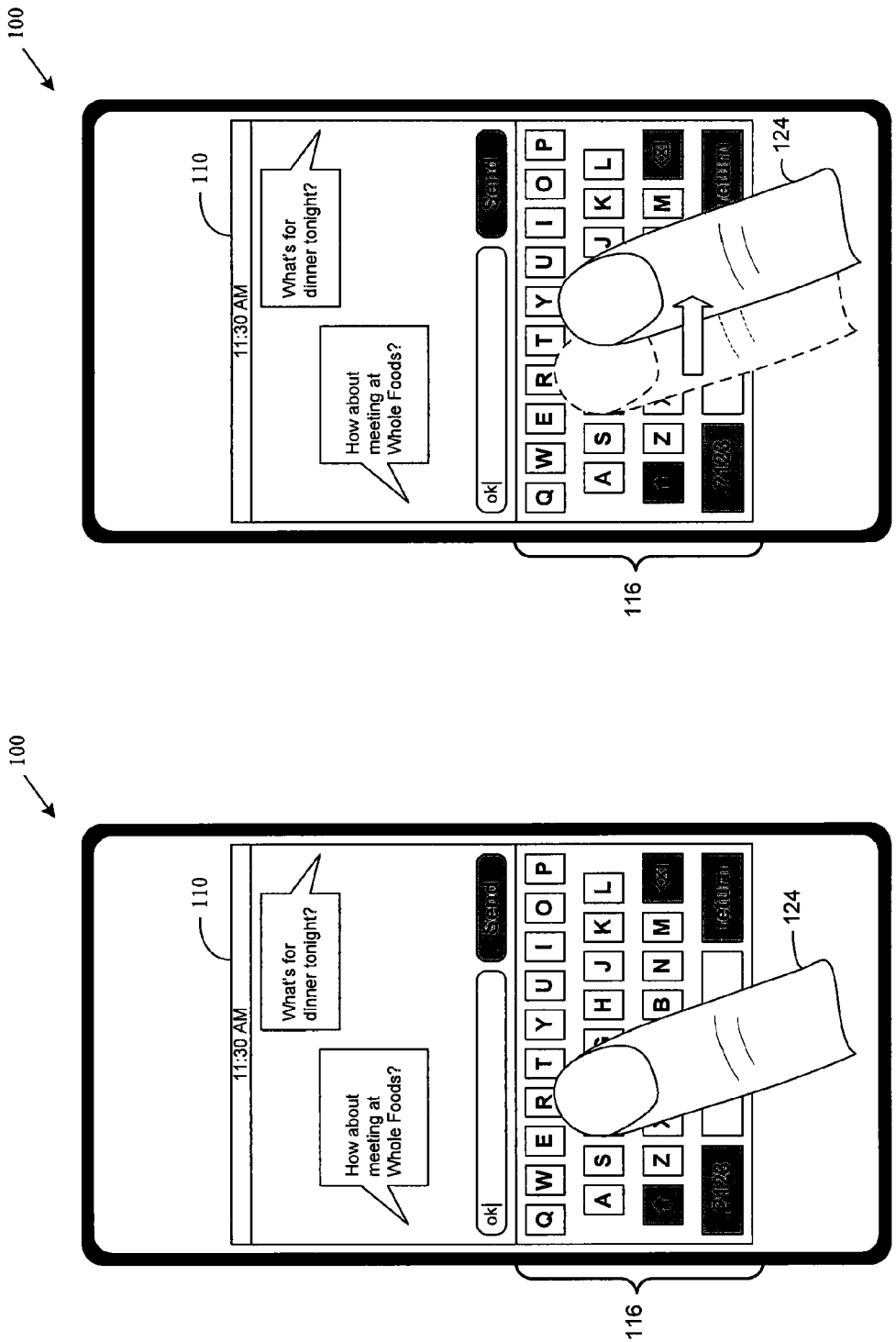

tangent of theta = Δy / Δx tangent of 45° = 1

θ = 45° tangent of 60° = √3

θ = 60°

SWIPE GESTURES FOR TOUCH SCREEN KEYBOARDS

CROSS-REFERENCE TO RELATED APPLICATIONS

This application is a divisional of U.S. patent application Ser. No. 11/766,929, filed Jun. 22, 2007, which is incorporated herein by reference in its entirety.

This is related to the following U.S. patents and patent applications, each of which is hereby incorporated by reference in its entirety:

U.S. Pat. No. 6,323,846, titled "Method and Apparatus for Integrating Manual Input," issued Nov. 27, 2001;

U.S. patent application Ser. No. 10/840,862, titled "Multipoint Touchscreen," issued May 6, 2004;

U.S. Provisional Patent Application No. 60/804,361, titled "Touch Screen Liquid Crystal Display," filed Jun. 9, 2006;

U.S. Provisional Patent Application No. 60/883,979, titled "Touch Screen Liquid Crystal Display," filed Jan. 8, 2007;

U.S. patent application Ser. No. 11/367,749, titled "Multifunctional Hand-held Device," filed Mar. 3, 2006;

U.S. patent application Ser. No. 11/228,737, titled "Activating Virtual Keys of a Touch-Screen Virtual Keyboard," filed Sep. 16, 2005;

U.S. patent application Ser. No. 11/228,700, titled "Operation of a Computer with a Touch Screen Interface," filed Sep. 16, 2005;

U.S. Pat. No. 6,677,932, titled "System and Method for Recognizing Touch Typing Under Limited Tactile Feedback Conditions," issued Jan. 13, 2004; and U.S. Pat. No. 6,570,557, titled "Multi-touch System and Method for Emulating Modifier Keys Via Fingertip Chords," issued May 27, 2003.

BACKGROUND

The present invention relates generally to input systems, methods, and devices, and more particularly, to systems, methods, and devices for interpreting manual swipe gestures as input in connection with touch-screen keyboards.

There currently exist various types of input devices for performing operations in electronic devices. The operations, for example, may correspond to moving a cursor and making selections on a display screen. The operations may also include paging, scrolling, panning, 'zooming, etc. The input devices may include, for example, buttons, switches, keyboards, mice, trackballs, pointing sticks, joy sticks, touch surfaces (including touch pads and touch screens, etc.), and other types of input devices.

Various types of touch surfaces and touch screens are described in the related applications cross-referenced above. Touch screens may include a display, a touch panel, a controller, and a software driver. The touch panel may include a substantially transparent panel that incorporates touch-sensing circuitry. The touch panel can be positioned in front of a display screen or constructed integrally with a display screen so that the touch sensitive surface corresponds to all or a portion of the viewable area of the display screen. The touch panel can detect touch events and send corresponding signals to the controller. The controller can process these signals and send the data to the computer system. The software driver can translate the touch events into computer events recognizable by the computer system. Other variations of this basic arrangement are also possible.

The computer system can comprise a variety of different device types, such as a pocket computer, handheld computer, or wearable computer (such as on the wrist or arm, or attached to clothing, etc.). The host device may also comprise devices such as personal digital• assistants (PDAs), portable media players (such as audio players, video players, multimedia players, etc.), game consoles, smart phones, telephones or other communications devices, navigation devices, exercise monitors or other personal training devices, or other devices or combination of devices.

In some embodiments, touch screens can include a plurality of sensing elements. Each sensing element in an array of sensing elements (e.g., a touch surface) can generate an output signal indicative of the electric field disturbance (for capacitance sensors), force (for pressure sensors), or optical coupling (for optical sensors) at a position on the touch surface corresponding to the sensor element. The array of pixel values can be considered as a touch, force, or proximity image. Generally, each of the sensing elements can work independently of the other sensing elements so as to produce substantially simultaneously occurring signals representative of different points on the touch screen 120 at a particular time.

Recently, interest has developed in touch-sensitive input devices, such as touch screens, for hand-held or other small form factor devices. For example U.S. patent application Ser. No. 11/367,749, titled "Multi-functional Hand-held Device," discloses a multi-functional hand-held device that integrates a variety of device functionalities into a single device having a hand-held form factor. In such applications, touch screens can be used for a variety of forms of input, including conventional pointing and selection, more complex gesturing, and typing.

Conventional touch-typing techniques may be difficult to use on touch-screen based small form factor devices. As a result, users often use "hunt and peck" typing techniques to input text into such devices. Various techniques for enhancing such textual input are disclosed in U.S. patent application Ser. Nos. 11/367,749; 11/228,737; and 11/228,700 and U.S. Pat. Nos. 6,677,932 and 6,570,557 incorporated by reference herein. It is believed that textual input on virtual keyboards can be further enhanced.

SUMMARY

The present invention can relate, for example, to a method of interpreting swipe gesture input to a device having a touch-sensitive input. The touch-sensitive input can include a virtual keyboard area, in which taps of a touch object generate text input. The method can include detecting a swipe gesture across the virtual keyboard, determining a direction of the swipe gesture, and performing a predetermined function determined by the direction of the swipe gesture. A swipe gesture can include a touchdown of a touch object followed by a sliding motion of the touch object across the virtual keyboard.

Detecting a swipe gesture can include acquiring touch image data from the touch-sensitive device, processing the image to generate one or more finger path events, determining a displacement of the one or more finger path events, and detecting a swipe gesture if the displacement exceeds a predetermined threshold. If the displacement does not exceed the threshold, the input can be interpreted as a conventional tap. The time of the motion associated with the input can also be compared to a maximum swipe gesture timeout threshold. If the timeout threshold is exceeded, the input can be interpreted as a conventional tap.

Determining the direction of a swipe gesture can include comparing a magnitude of a vertical displacement of the swipe gesture to a magnitude of a horizontal displacement of the swipe gesture. A swipe gesture can be interpreted as a vertical swipe gesture if the vertical displacement is greater than the horizontal displacement. Alternatively, a swipe gesture can be interpreted as a horizontal swipe gesture if the vertical displacement is less than the horizontal displacement. Alternatively, determining the direction of a swipe gesture can include comparing a ratio of the vertical displacement of the swipe gesture to the horizontal displacement of the swipe gesture to a predetermined threshold. A swipe gesture can be interpreted as a vertical swipe gesture if the ratio is greater than the threshold, while a swipe gesture can be interpreted as a horizontal swipe gesture if the ratio is less than the threshold.

A vertical swipe gesture can be interpreted as an upward or downward swipe gesture depending on the sign (ie., positive or negative) of the vertical displacement. A horizontal swipe gesture can be interpreted as a rightward or leftward swipe gesture depending on the sign ((ie., positive or negative) of the horizontal displacement.

A variety of functions can be invoked using the swipe gestures. For example, the swipe gestures can be used for spacing, erasing, or punctuation insertion. Feedback can be presented to the user indicating the function performed. The functions performed by particular swipe gestures may also be customized by the user.

Particular swipe gestures that can be linked to particular functions can include using a rightward swipe gesture to invoke a space, using a leftward swipe gesture to invoke a backspace, using a downward swipe gesture to invoke a carriage return and/or a new line, and using an upward swipe gesture to invoke a shift. Additionally, a second upward swipe gesture can be used to invoke a caps lock. The second upward swipe can either be performed sequentially to the first upward swipe or concurrently with the first upward swipe, i.e., as a multi-fingered swipe gesture. Other alternative mappings of swipe gestures to functions include using an upward swipe gesture to insert a punctuation character, such as a period or apostrophe.

Multi-fingered swipe gestures can be used to invoke additional functionality. For example, a multi-fingered leftward swipe can be used to invoke deletion of a word in a manner analogous to using a leftward swipe gesture as a backspace. Similarly, a multi-fingered rightward swipe can be used to insert a punctuation character and a space, such as a period and a space at the end of a sentence. Swipe gestures can also be used to invoke alternative keyboards containing punctuation, numbers, or special symbols of various types.

The present invention can also relate to a computer system including a multi-touch interface that has been adapted and/or programmed to detect and process swipe gesture input in the various ways described above. The computer system can take the form of a desktop computer, a tablet computer, a notebook computer, a handheld computer, a personal digital assistant, a media player, a mobile telephone, and combinations of one or more of these items. The multi-touch interface can include a touch screen.

In some embodiments, the computer system can include a touch image processor that receives touch image data from the multi-touch interface and generates finger path tracking events. These finger path tracking events can be processed by a keyboard tap recognizer and a keyboard slide recognizer, which generate key tap and swipe events, respectively, in response to the touch input received. A keyboard input manager can receive the key tap events and the keyboard swipe events and generates text events for an application running on the computer system and feedback popup graphics to be displayed on a display of the computer system.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 2A-2C depict a user invoking a backspace using a leftward swipe gesture in accordance with an embodiment of the present invention.

FIGS. 4A-4C depict a user invoking a space using a rightward swipe gesture in accordance with an embodiment of the present invention.

DETAILED DESCRIPTION

Figure 1B:
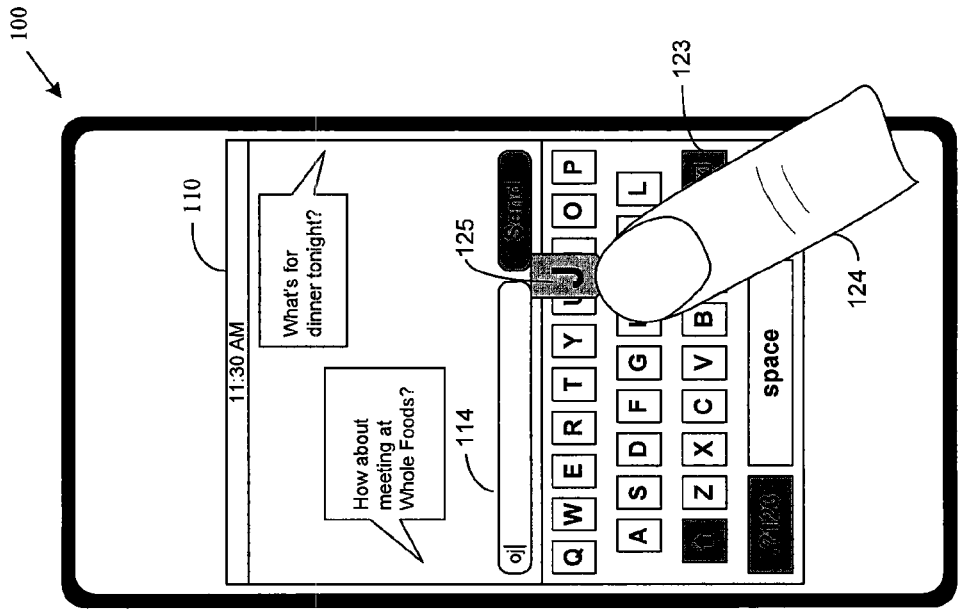
FIGS. 1A-1B depict a front plan view of a user typing using an exemplary electronic device with touch screen display in accordance with an embodiment of the present invention.
Figure 1A:
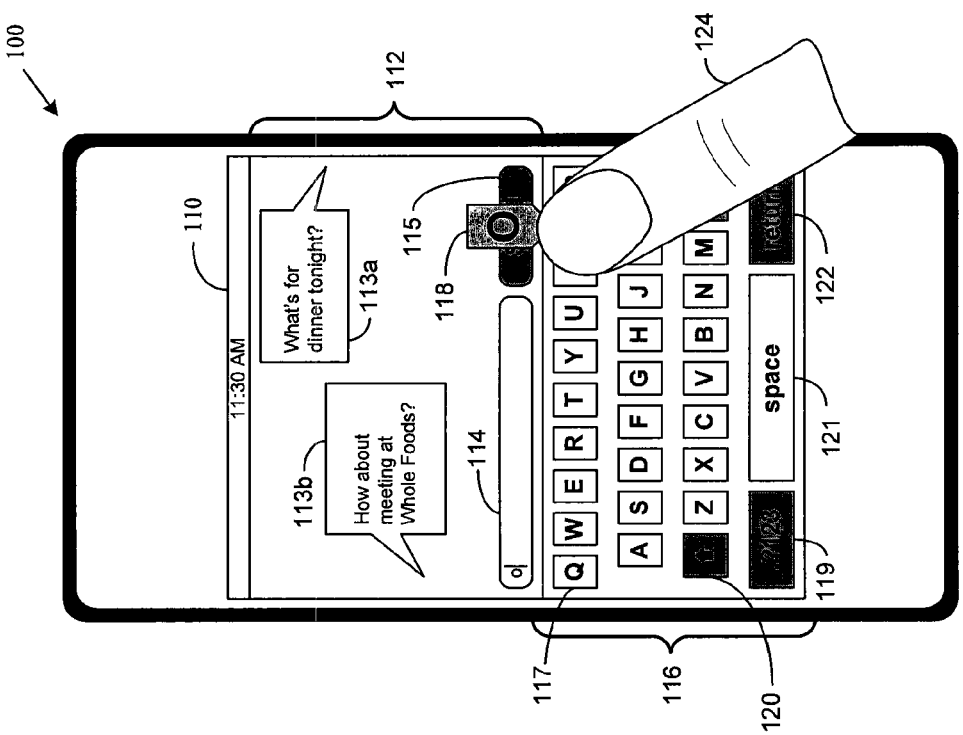

Reference is now made to FIG. 1A, which depicts a front plan view of an exemplary electronic device 100 that implements a touch screen-based virtual keyboard. Electronic device 100 includes a display 110 that also incorporates a touch screen. The display 110 can be configured to display a graphical user interface (GUI). The GUI may include graphical and textual elements representing the information and actions available to the user. For example, the touch screen may allow a user to move an input pointer or make selections on the GUI by simply pointing at the GUI on the display 110.

As depicted in FIG. 1A, the GUI can be adapted to display a program application that requires text input. For example, a chat or messaging application is depicted. For such an 'application, the display can be divided into two basic areas. A first area 112 can be used to display information for the user, in this case, the messages the user is sending, represented by balloon 113a and the messages he is receiving from the person he is communicating with, represented by balloon 113b. First area 112 can also be used to show the text that the user is currently inputting in text field 114. First area 112 can also include a virtual "send" button 115, activation of which causes the messages entered in text field 114 to be sent.

A second area can be used to present to the user a virtual keyboard 116 that can be used to enter the text that appears in field 114 and is ultimately sent to the person the user is communicating with. Touching the touch screen at a "virtual key" 117 can cause the corresponding character to be generated in text field 114. The user can interact with the touch screen using a variety of touch objects, including, for example, a finger, stylus, pen, pencil, etc. Additionally, in some embodiments, multiple touch objects can be used simultaneously.

Because of space limitations, the virtual keys may be substantially smaller than keys on a conventional keyboard. To assist the user, "top hats" 118 can indicate to the user what key is being pressed. Additionally, not all characters that would be found on a conventional keyboard may be presented. Such special characters can be input by invoking an alternative virtual keyboard. For example, a virtual key 119 can be used to invoke an alternative keyboard including numbers and punctuation characters not present on the main virtual keyboard. Additional virtual keys for various functions may be provided. For example, a virtual shift key 120, a virtual space bar 121, a virtual carriage return or enter key 122, and a virtual backspace key (not shown in FIG. 1A, 123 in FIG. 1B) are provided in the illustrated embodiment.

To provide more convenient use of certain keys, for example, erasing and basic punctuation insertion, directional swipes (also referred to herein as "swipe gestures") over the alphabetic keys can be used as an alternative to striking certain keys. Because the Space and Backspace keys are quite frequently used, they are logical candidates for the rightward and leftward swipes, respectively. Leftward and rightward swipes intuitively match the cursor travel caused by these symbols. Following this cursor movement analogy, the Enter/Return may be invoked by a downward swipe, and a Shift/Caps may be invoked by an upward swipe. Alternatively, as the Enter and Shift functions may be less frequently invoked, these may be substituted for other functions as well. One alternative mapping for the upward swipe, for example, could be to activate an alternative numeric and punctuation keypad or a particular punctuation symbol like an apostrophe or period.

Interspersing the tedious task of typing using the small keys with swipes that do not require a specific point of origin can give users a nice break from the sensorimotor and cognitive load of targeting very tiny keys. Additionally, this can allow users to keep their eyes focused and fingers on the central alphabetic layout, avoiding thumb contortions to hit space, backspace, shift and return keys that may be located in the bottom row or corners.

An example of the usage of such a swipe gestures can be seen with respect to FIGS. 1A through 8. In FIG. 1A, the user is entering the text "ok" in response to a query received through a chat application. By tapping finger 124 on the area corresponding to the letter "o" on virtual keyboard 116 the letter "o" is entered in text field 114. A top hat 118 with a representation of the letter "o" is displayed providing feedback to the user. As shown in FIG. 1B, the user then attempts to tap the letter "k" using finger 124. However, the user inadvertently taps the letter "j" as indicated by top hat 125.

Figure 2C:
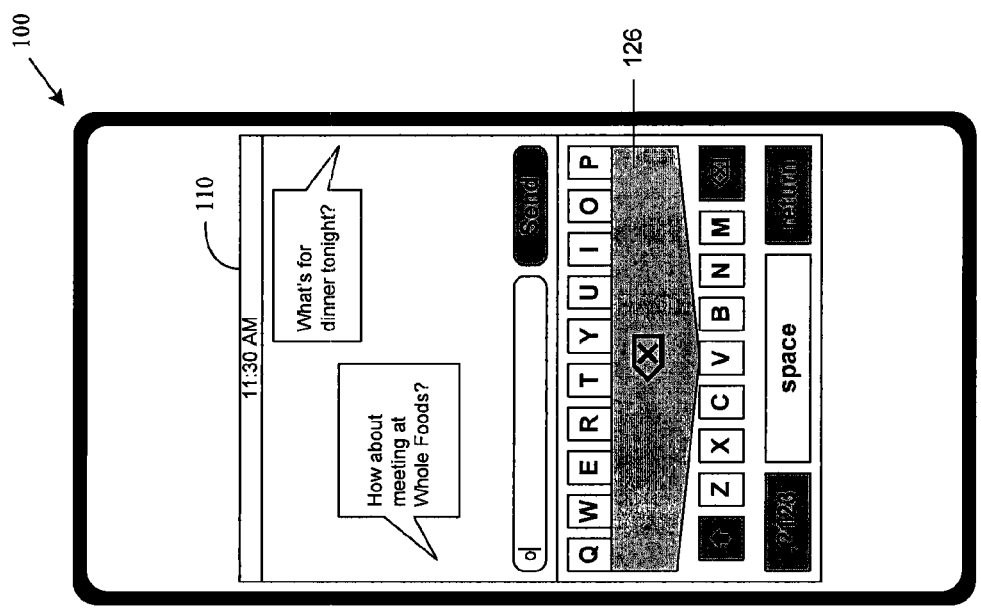

Although this typographical error could be corrected through the use of virtual backspace key 123, the backspace function can also be invoked by the rightward swipe illustrated in FIGS. 2A through 2C.

As illustrated in FIGS. 2A through 2C, the backspace function can be invoked with a leftward swipe of finger 124. As described in greater detail below, the swipe can include a touchdown of finger 124 in the virtual keyboard 116 followed by a sliding leftward motion in contact with the touch-sensitive surface (FIG. 2B). After the leftward motion, the finger is lifted (FIG. 2C) and the backspace function is executed, removing the erroneously typed letter "j." Optionally, a top hat 126 can be used to indicate to the user that the backspace function was performed. Other visual feedback, such as highlighting or flashing the key corresponding to the backspace gesture can also be used. The top hats can also have graphic arrows or other effects indicating and reminding the user of the direction of swipe that can activate that key.

Figure 3:
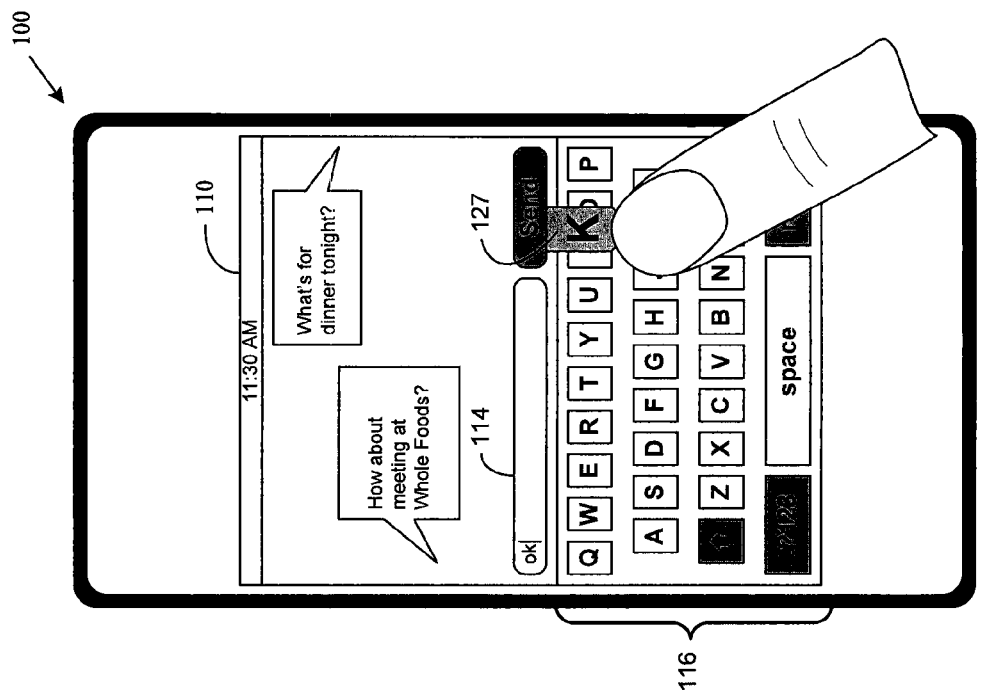
FIG. 3 depicts a user typing in accordance with an embodiment of the present invention.
Figure 4C:
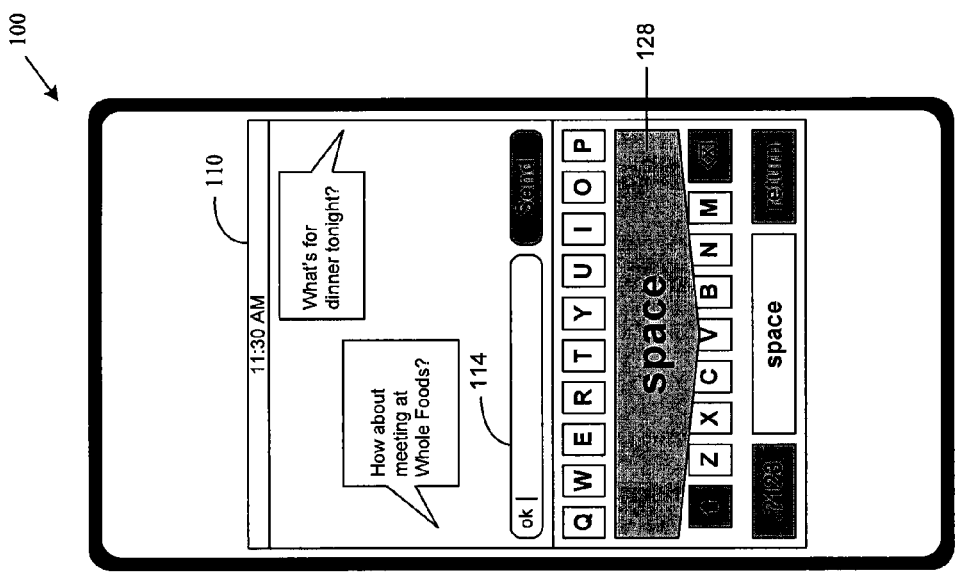

As illustrated in FIG. 3, the user can now enter the "k" of the "ok" by tapping the appropriate region of virtual keyboard 116. A top hat 127 indicates that the letter "k" was pressed, as well as the appearance of the "k" character in text field 114. A space following the "ok" may be entered using a rightward swipe as illustrated in FIGS. 4A through 4C. Like the leftward swipe, the rightward swipe comprises a touchdown of finger 124 in virtual keyboard 116 (illustrated in FIG. 4A). This touchdown is followed by a rightward swipe across the virtual keyboard area 116 (illustrated in FIG. 4B). After liftoff of the finger, a space appears in text field 114, and a top hat 128 (or other visual feedback as discussed above) can be used to indicate that the space was entered.

Figure 5A:
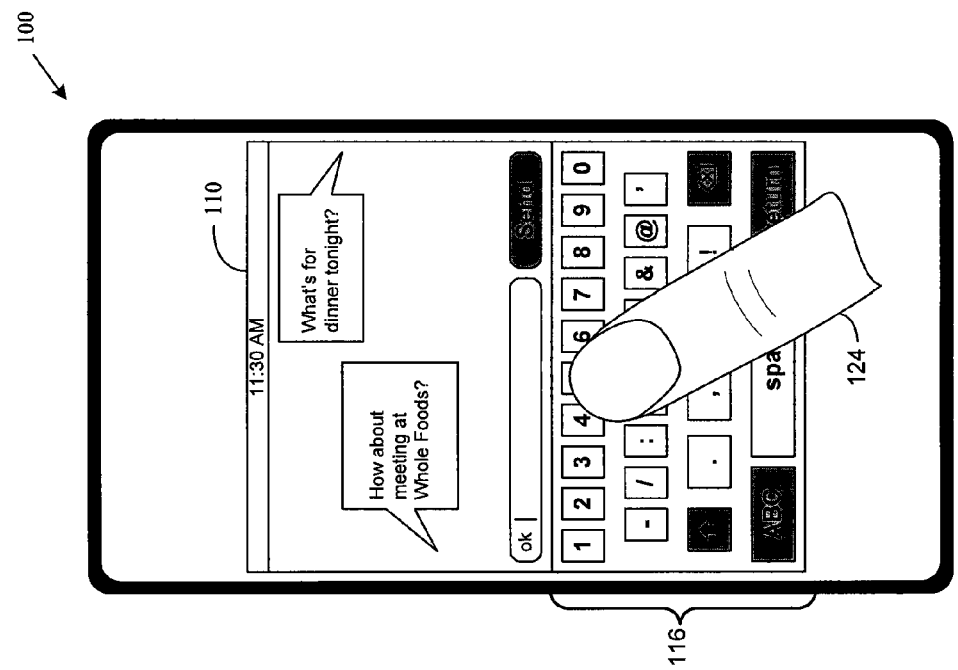
FIGS. 5A-5C depict a user invoking a carriage return/new line using a downward swipe gesture in accordance with an embodiment of the present invention.
Figure 5C:
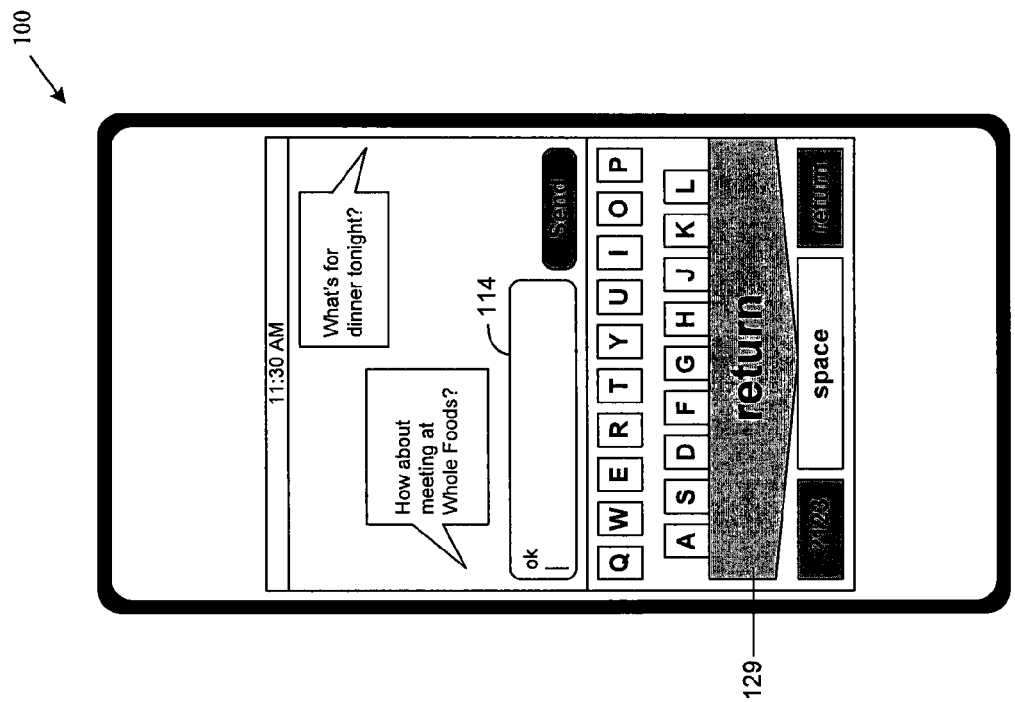
Figure 5B:
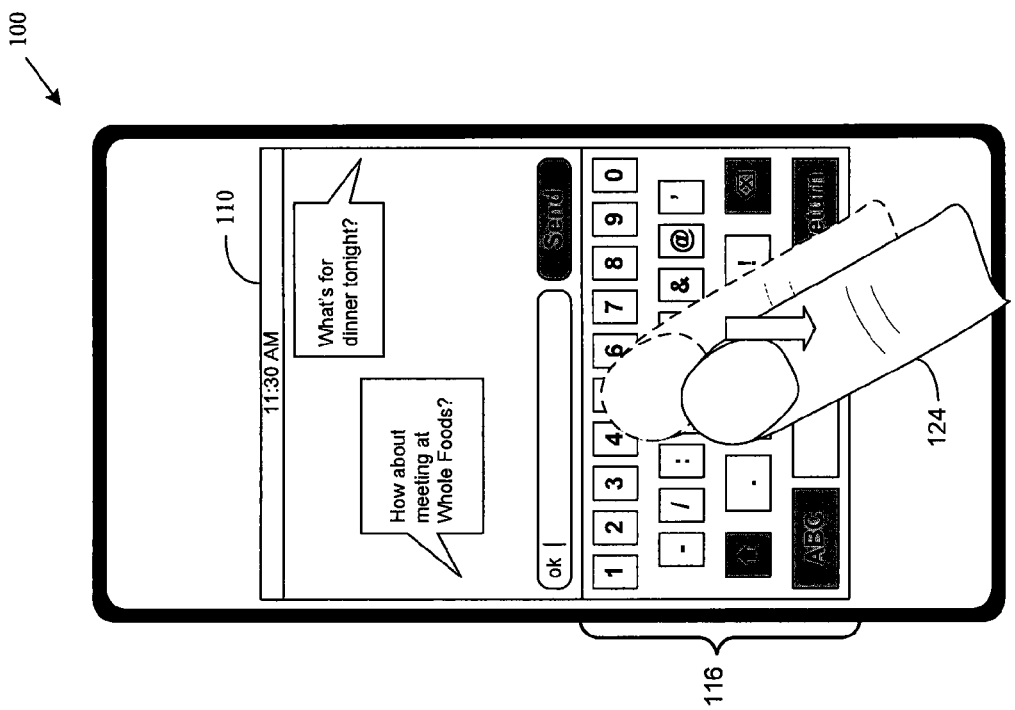

Use of a downward swipe to enter a carriage return and new line is illustrated in FIGS. 5A through 5C. Again, the downward swipe includes a touchdown of the finger 114 in virtual keyboard 116 (illustrated in FIG. 5A). This touchdown is followed by a downward motion of the finger across the virtual keyboard (illustrated in FIG. 5B). The insertion of the carriage return and new line after liftoff of the finger is indicated to the user by the appearance of the new line in text field 114 and the appearance of top hat 129 indicating that the return was invoked (illustrated in FIG. 5C).

Figure 6B:
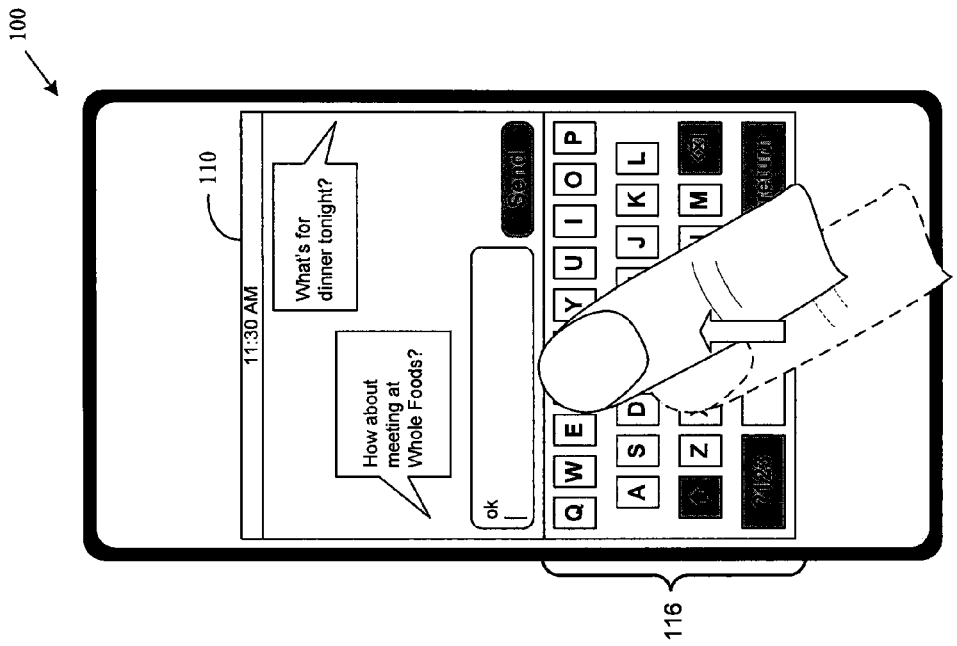
FIGS. 6A-6D depict a user invoking a shift using an upward swipe gesture in accordance with an embodiment of the present invention.
Figure 6A:
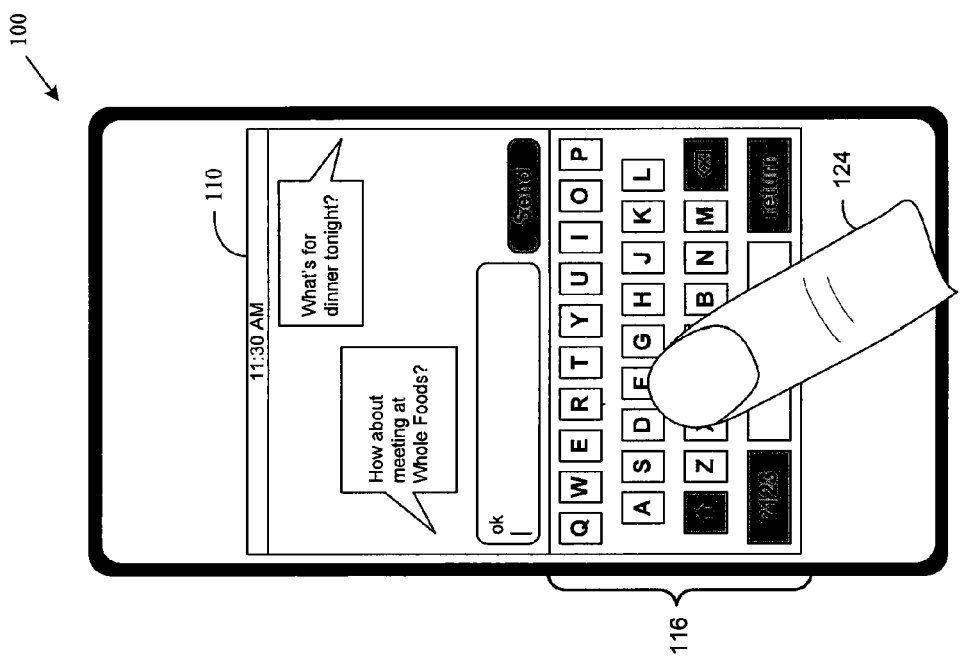
Figure 6D:
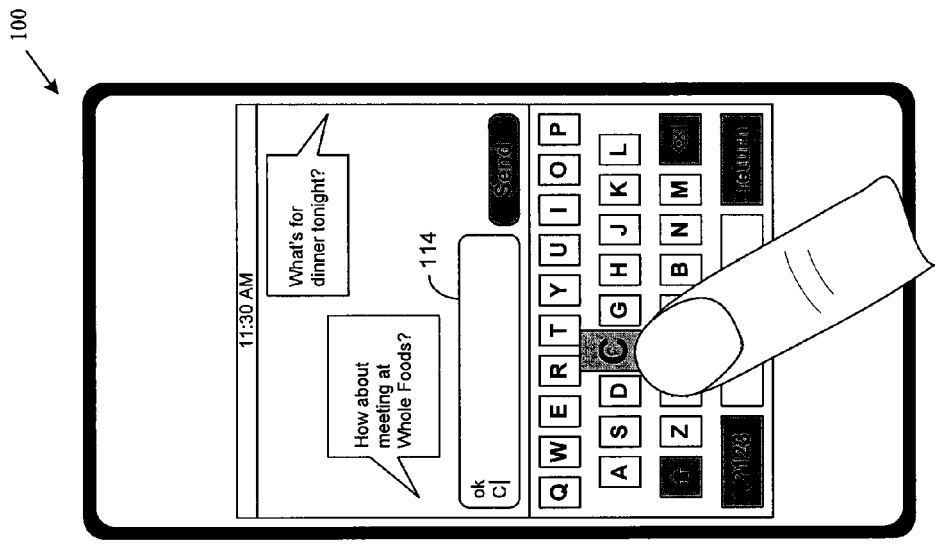
Figure 6C:
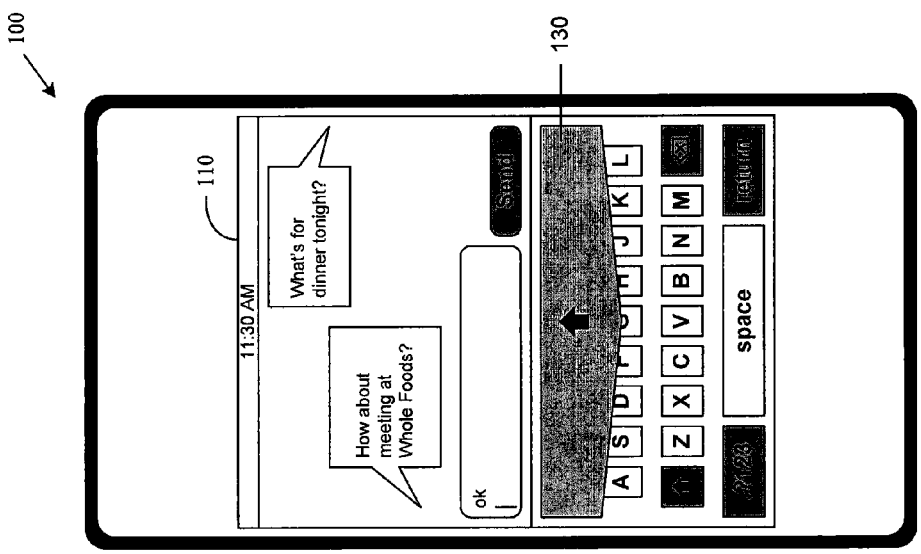

Use of an upward swipe to invoke a shift for the entry of capital letters is illustrated in FIGS. 6A through 6D. As illustrated in FIG. 6A, the swipe gesture starts with a touchdown of finger 124 in virtual keyboard area 116. The touchdown is followed by an upward slide across the virtual keyboard area 116, as illustrated in FIG. 6B. As illustrated in FIG. 6C, liftoff of the finger following the upward slide invokes the shift, as indicated by display of the top hat 130. A subsequent tap of a virtual key (e.g., the letter "c") results in a capital "C" being entered in the text field 114.

Figure 7:
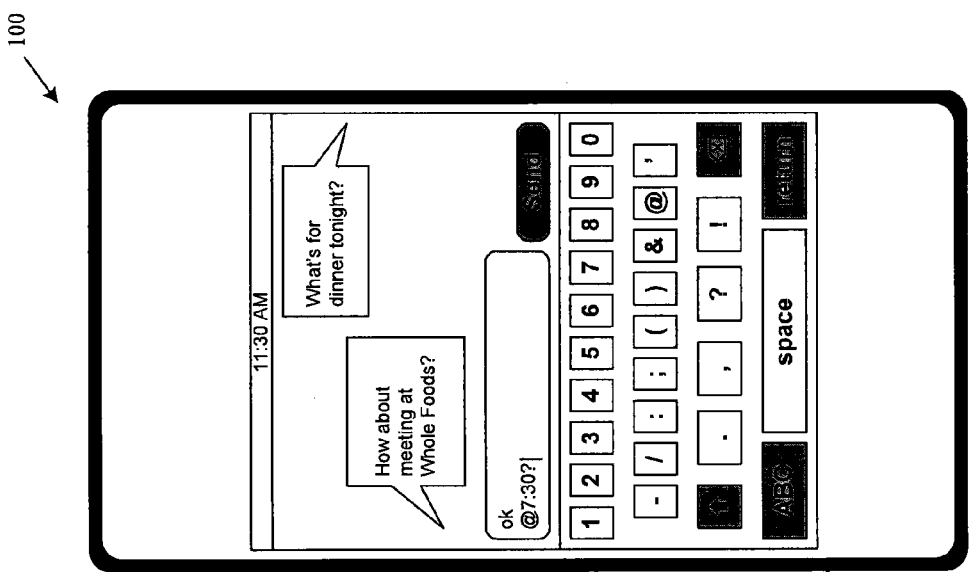
FIG. 7 depicts a user invoking a caps lock using two sequential upward swipe gestures in accordance with an embodiment of the present invention.
Figure 8:
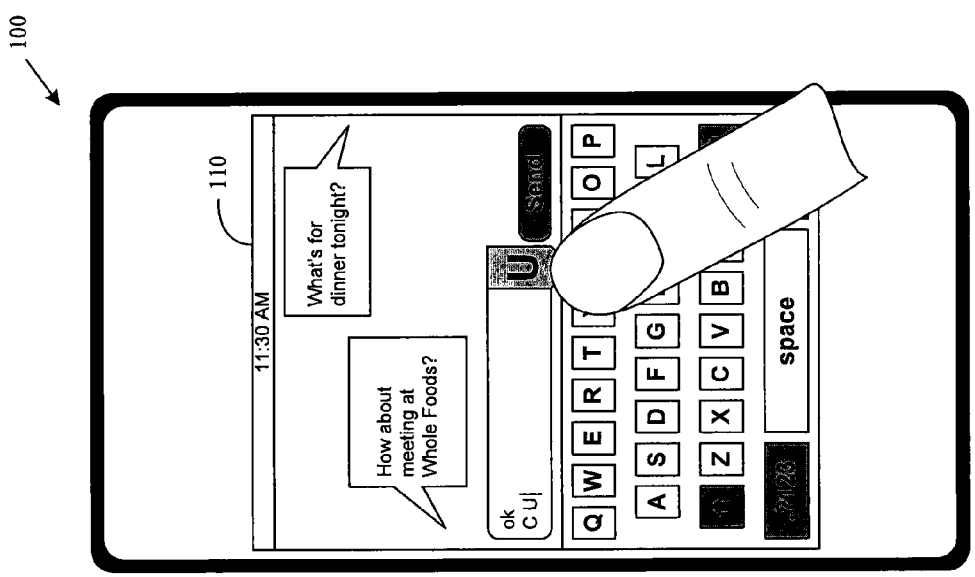
FIG. 8 depicts a user invoking the display of an alternative keyboard using a swipe gesture in accordance with an embodiment of the present invention.

In a variation of this arrangement, two upward swipes can invoke a Caps Lock, i.e., a shift that applies capitalization to a sequence of typed letters. The two upward swipes can be performed sequentially or can be performed simultaneously, i.e., as a two-fingered upward swipe. Such a scenario is illustrated in FIG. 7. Other numbers of swipes or numbers of fingers could also be used. Alternatively, an upward stroke can be used to invoke an alternative keyboard. As noted above, small virtual keyboards may not include numeric and punctuation characters, so an upward swipe as described above could cause a second virtual keyboard 131 to be displayed, the second virtual keyboard including numeric and punctuation characters or other special characters such as alternative alphabets, special symbols, etc.

The examples above have focused primarily on the use of single-finger swipe gestures. However, other numbers of fingers could also be used to implement these functions. Additionally, multiple-finger swipes could be used to implement additional functions. For example, a single-finger leftward swipe could be used to invoke a backspace key, which would delete a previous character. A two-finger leftward swipe could be used to delete a previously entered word. A three-finger leftward swipe could be used to delete a line. (In each case, the number of fingers can vary.) Similarly, a single finger rightward swipe could be used to invoke a space, while a two-finger rightward swipe could be used to invoke a period and a space, ending a sentence. Alternatively, a two-finger rightward swipe could be used to accept a word completion suggestion offered by the application. Similarly, a three-finger rightward swipe could be used to display a listing of possible word completions. (Again, the number of fingers can vary.)

Multi-finger swipes can also apply to swipes in the upward and downward directions. For example, a single-finger upward swipe could invoke a shift that applies only to the next entered character. A two-finger upward swipe could invoke a caps lock mode or an accented character mode (e.g., for foreign languages). A three-finger upward swipe could invoke an accent mode or an alternative keypad mode (e.g., punctuation, numeric, accented, etc.). Similarly, a single-finger downward swipe can invoke a new line, carriage return, or enter. A two-finger downward swipe can invoke a period (or other punctuation). A three-finger downward swipe can invoke a punctuation pad. (As above, the number of fingers in each case can vary.)

As will be appreciated, numerous other variations along these lines are also possible. Additionally, an interface can be provided to permit a user to customize the activity that will be performed in response to various swipe gestures.

Figure 9:
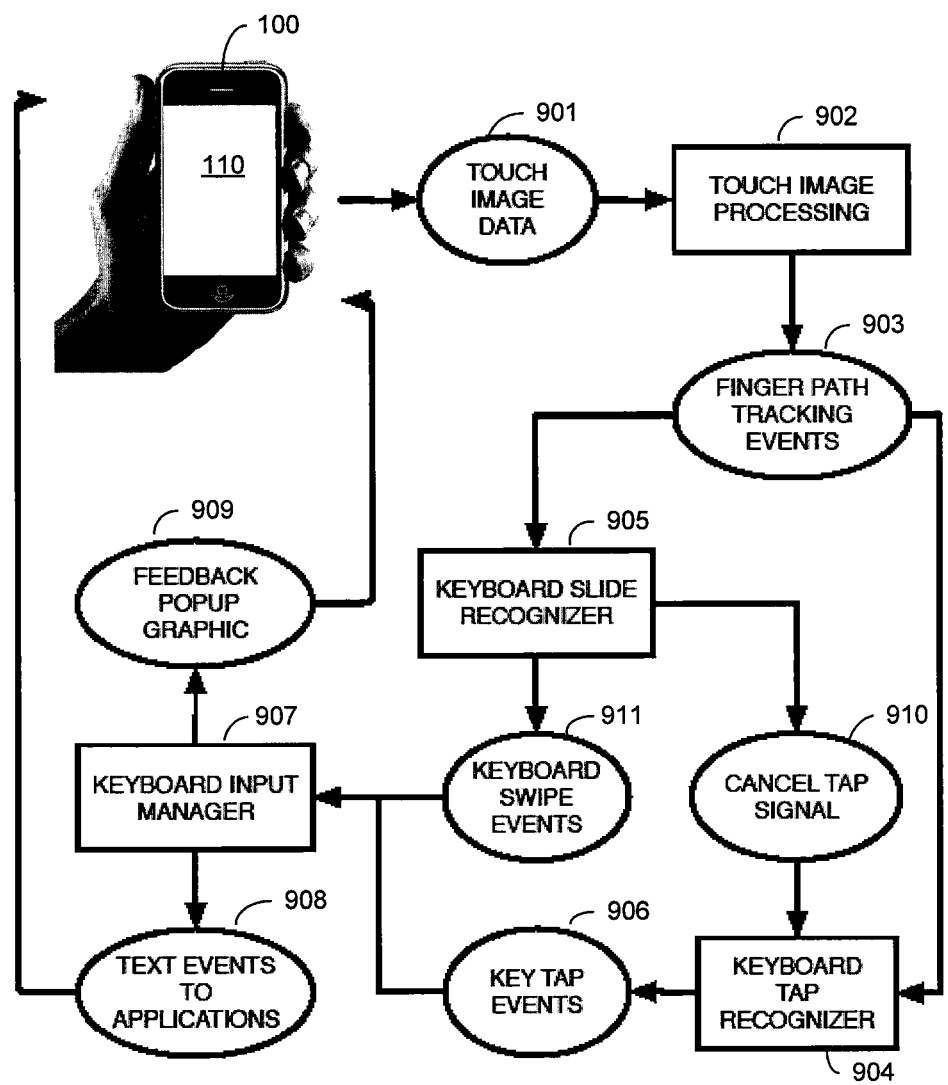
FIG. 9 depicts a block diagram of an exemplary swipe recognition system in accordance with various embodiments of the present invention.
Figure 10:
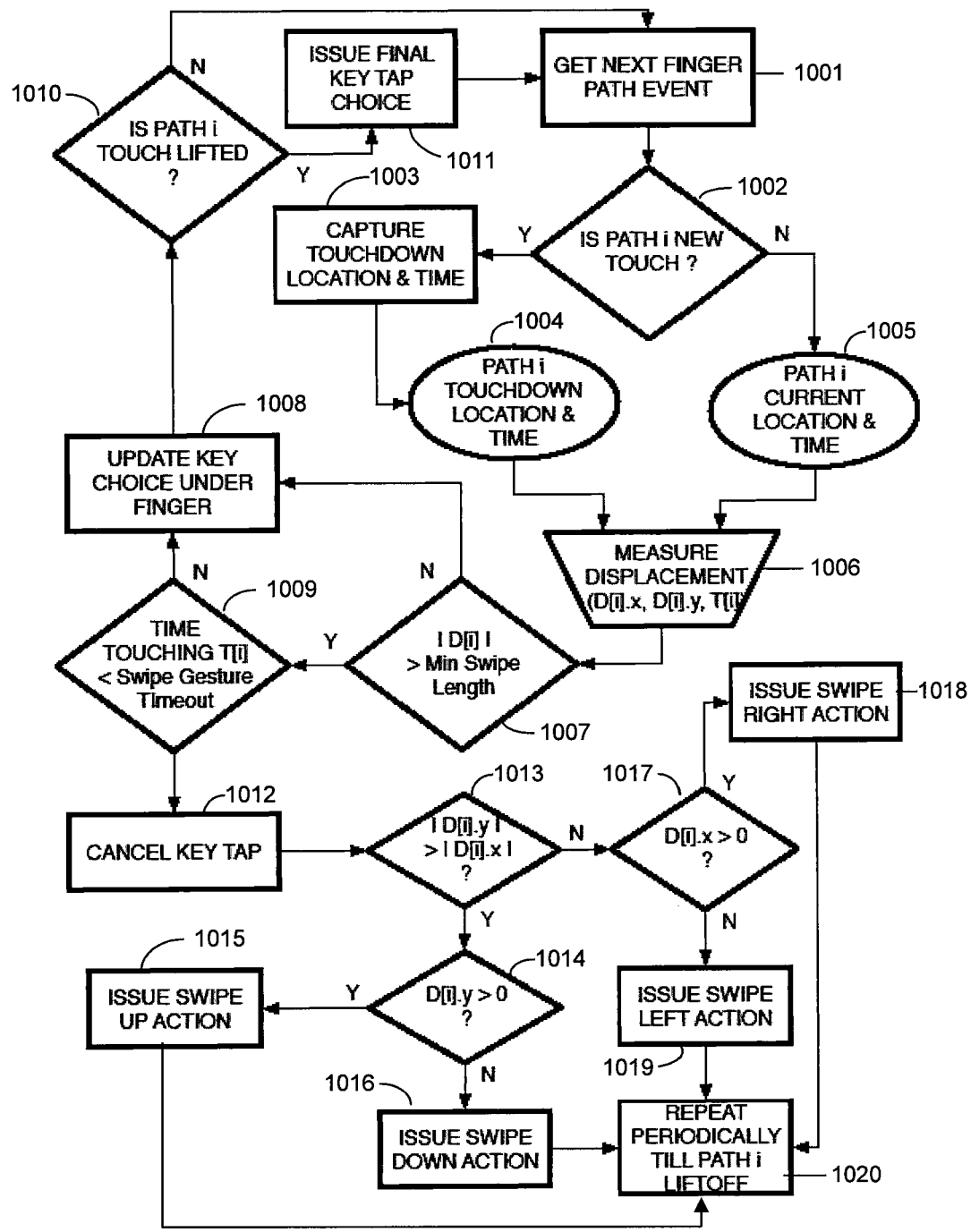
FIG. 10 depicts a flow chart of an exemplary swipe gesture detection technique in accordance with various embodiments of the present invention.

Having described a user's interaction with the system, the operation of such a system may be understood with reference to FIGS. 9 and 10. FIG. 9 depicts a block diagram of a system implementing various aspects of the present invention. In FIG. 9, data structures and signals are represented with elliptical blocks. As would be understood by one skilled in the art, these data structures and signals can take a variety of forms depending on a particular implementation. In FIG. 9, processors for the data and signals are depicted with rectangular blocks. These processors can be implemented in hardware, software, firmware, or combinations thereof. Examples of data structures, signals, hardware, software, and firmware that can be used to implement the teachings of the present disclosure appear in the various references incorporated above.

As shown in FIG. 9, a handheld device 100 can incorporate a touch screen 110. The touch screen detects touch events, which can be encoded in the form of touch image data 901. This touch image data is submitted to touch image processor 902. Details regarding touch image acquisition and processing are described in U.S. Pat. No. 6,323,846, which incorporated by reference. For present purposes, it is sufficient to understand that the processing of the touch image results in one or more finger path tracking events 903. These finger path tracking events can be submitted to two separate processes, keyboard tap recognizer 904 and keyboard slide recognizer 905.

Keyboard tap recognizer 904 can serve to translate taps on the virtual keyboard surface in to key tap events 906. These key tap events are submitted to keyboard input manager 907. Keyboard input manager 907 interprets key tap events 906 and generates text events 908 that are sent to the applications, e.g., the entry of letters into text fields as described above. Keyboard input manager 907 also generates feedback popup graphics 909, e.g., the top hats showing which letter has been tapped that were described above.

Keyboard slide recognizer 905 can serve to recognize the sliding motions that distinguish keyboard taps from swipe gestures. If a swipe is detected, the tap that would have been recognized at the initial contact position of the swipe gesture must be cancelled. This can be accomplished by sending cancel tap signal 910 to keyboard tap recognizer 904. Keyboard slide recognizer 905 also generates keyboard swipe events 911 that can be submitted to keyboard input manager 907. As in the case of key taps, keyboard input manager 907 can generate text events 908 as well as pop up graphics 909 that correspond to the detected swipes.

FIG. 10 shows a combined flow chart for an implementation of keyboard tap recognizer 904 and keyboard slide recognizer 905. In block 1001, a finger path event is retrieved. In block 1002 it is determined if the new path event corresponds to a new touch, e.g., a finger that has just appeared on the surface. If so, the touchdown location and time are captured (block 1003), and a path data structure 1004 containing this information is created. If the finger path event is not a new touch, a preexisting path data structure 1005 is updated with the current location and time of the touch.

In either case, the path data structure (1004 or 1005) is submitted to a displacement measurement process (block 1006). The displacement measurement process can determine how much the path has moved in both horizontal direction (D[i].x), how much the path has moved in the vertical direction (D[i].y), and over what time (T[i]). The total distance moved can then be compared to a minimum threshold of movement used to determine whether the touch event is a tap or a swipe (block 1007). If there is little motion, i.e., less than the threshold, the event is interpreted as a key tap, and the system updates the key choice that corresponds to the location of the finger (block 1008).

If the motion exceeds the minimum swipe length threshold (block 1007), a second test can be performed to determine whether the time of the motion is less than a swipe gesture timeout (block 1009). This optional time threshold can be used to allow slower motions to permit a user to fine tune key selection e.g., using the displayed top hats. If the time of the motion is greater than the swipe gesture timeout threshold, i.e., took too long to be a swipe gesture, the event is interpreted as a key tap, and the system updates the key choice that corresponds to the location of the finger (block 1008). As an alternative to the time threshold, the system can instead look for an initial velocity at touchdown to distinguish a swipe from a tap.

If the path is determined to be a key tap, the key choice currently under the finger is updated (block 1008). Then, if a liftoff of the touch is detected (block 1010), the final key tap choice is issued (block 1011). If a liftoff is not detected (block 1010), the next finger path event is detected (block 1001), and the process repeats.

Alternatively, if the path has been determined to exceed the minimum length threshold for a swipe gesture (block 1007) and has been determined to be less than the maximum time threshold for a swipe threshold (block 1009), the path can be interpreted as a swipe event. As a result, a cancel key tap signal is generated (block 1012). The direction of the swipe gesture can then be determined as follows.

The magnitude of the vertical motion of the path displacement can be compared to the magnitude of the horizontal motion of the path displacement (block 1013). (Both parameters were determined in block 1006). If the total vertical motion is greater than the total horizontal motion, it can determined whether the vertical displacement is positive (upward) (block 1014). If so, the event can be interpreted as an upward swipe, and the appropriate action can be invoked (block 1015). If the vertical displacement is negative, the event can be interpreted as a downward swipe, and the appropriate action can be invoked (block 1016).

Alternatively, if the total vertical motion is determined to be less than the total horizontal motion (block 1013), it can be determined whether the horizontal displacement is positive (rightward) (block 1017). If so, the event can be interpreted as a rightward swipe, and the appropriate action can be invoked (block 1018). If the horizontal displacement is negative, the event can be interpreted as a leftward swipe, and the appropriate action can be invoked (block 1019).

For any of the invoked swipes, i.e., upward swipe (block 1015), downward swipe (block 1016), rightward swipe (block 1018), or leftward swipe (block 1019), the swipe action can be repeated if the touch is held down for a short period of time (block 1020). This action can be similar to holding down a key on a conventional keyboard. For example, if a finger is held down for a short time at the end of the swipe (e.g., about a second), the swipe symbol can begin repeating at a predetermined interval. A repeat interval of 100-500 ms, and preferably around 200 ms, is suitable, although other intervals could be used.

Figure 11A:
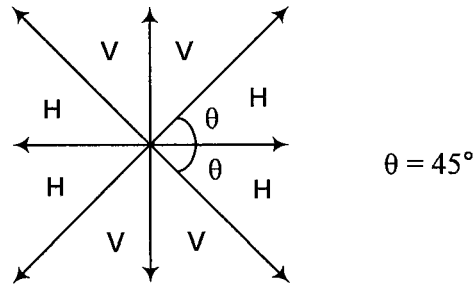
FIGS. 11A-11C depict an alternative method of distinguishing vertical swipes from horizontal swipes in accordance with various embodiments of the present invention.

The technique for determining whether a swipe is horizontal or vertical discussed above with respect to block 1013 implicitly assumes that swipes at an angle greater than 45° will be interpreted as vertical and swipes at an angle less than 45° will be interpreted as horizontal swipes. The coordinate system of FIG. 11A includes horizontal and vertical axes and separating lines drawn on 45° angles that create eight sectors. The four sectors in which the magnitude of the vertical motion exceeds the magnitude of the horizontal motion are identified with a letter "V," and the four sectors in which the magnitude of the horizontal motion exceeds the magnitude of the vertical motion are identified with a letter "H." Thus, the test in block 113 could be replaced with determining whether the tangent of the ratio between the vertical and horizontal motion is greater than 1. If so, the motion is vertical; if not, the motion is horizontal.

Figure 11B:
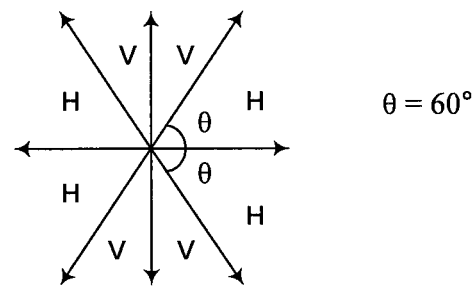
Figure 11C:
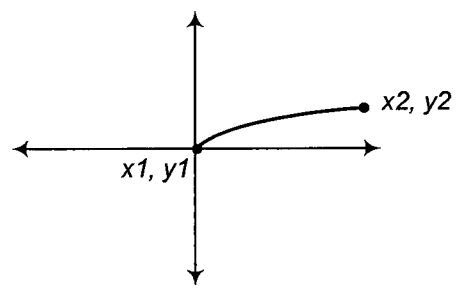

However, it may be desired to change the angle that is used to discriminate between horizontal and vertical swipes. For example, because of the way a device is held, there may tend to be some vertical motion included with a horizontal swipe because of the way a user's joints are arranged, etc. As shown in FIG. 11C, a rightward swipe may include a vertical displacement because of the path traced by a thumb that is also holding the device. As shown in FIG. 11B, 60° (or any other angle) can also be used to discriminate between horizontal and vertical swipes. In the given example, the tangent of the ratio of vertical displacement of the path to horizontal displacement of the path can be compared to $\sqrt{3}$ (or any other tangent value corresponding to the desired angle). This idea can also be used to create additional swipes. For example, in addition to the up, down, left, and right swipes, diagonal up-left, diagonal up-right, diagonal down-left, and diagonal down-right swipes can also be created, with ranges of angles (and corresponding tangents thereof) used to discriminate amongst them.

Figure 13:
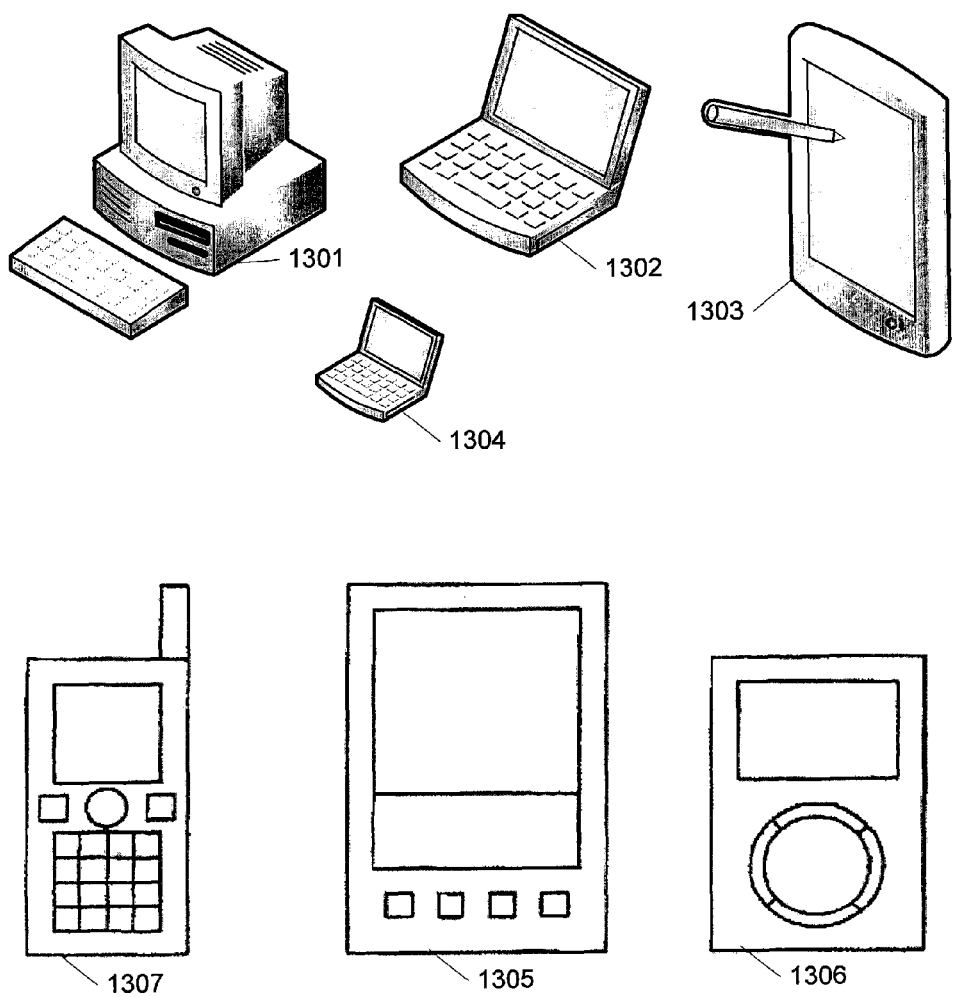
FIG. 13 depicts various computer form factors that may be used in accordance with embodiments of the present invention.

An example computer system 1300 that can implement swipe gestures as described above is illustrated in the simplified schematic of FIG. 13. The program may be stored in a memory 1305 of the computer system, including solid state memory (RAM, ROM, etc.), hard drive memory, or other suitable memory. CPU 1304 may retrieve and execute the program. CPU 1304 may also receive input through a multi-touch interface 1301 or other input devices not shown. In some embodiments, I/O processor 1303 may perform some level of processing on the inputs before they are passed to CPU 1304. CPU 1304 may also convey information to the user through display 1302. Again, in some embodiments, an I/O processor 1303 may perform some or all of the graphics manipulations to offload computation from CPU 1304. Also, in some embodiments, multi-touch interface 1301 and display 1302 may be integrated into a single device, e.g., a touch screen.

Figure 12:
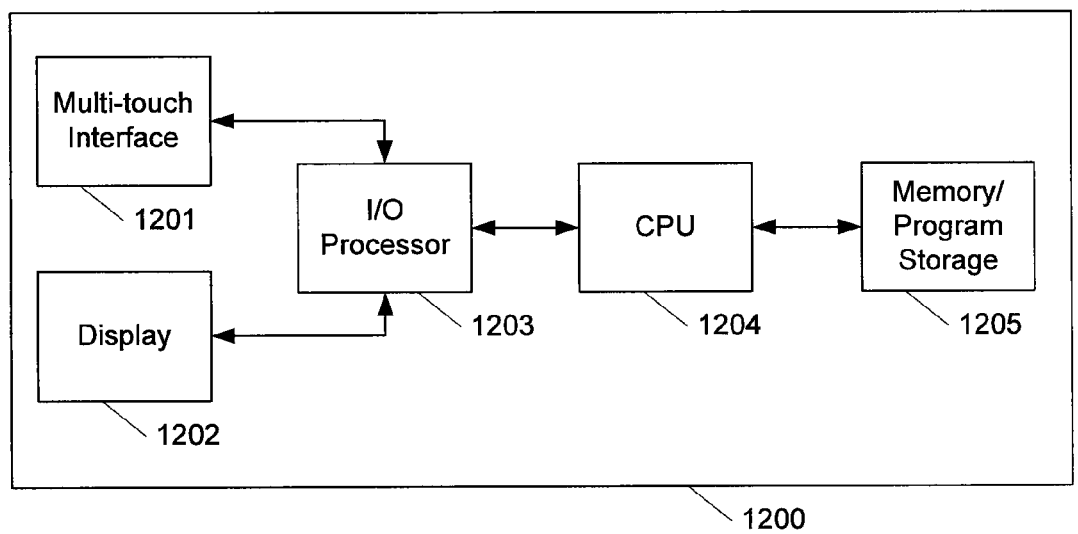
FIG. 12 depicts a simplified block diagram of a computer system implementing one or more embodiments of the present invention.

The computer system may be any of a variety of types illustrated in FIG. 12, including desktop computers 1201, notebook computers 1202, tablet computers 1203, handheld computers 1204, personal digital assistants 1205, media players 1206, mobile telephones 1207, and the like. Additionally, the computer may be a combination of these types, for example, a device that is a combination of a personal digital assistant, media player, and mobile telephone.

Further modifications and alternative embodiments will be apparent to those skilled in the art in view of this disclosure. For example, although the foregoing description has discussed touch screen applications in handheld devices, the techniques described are equally applicable to touch pads or other touch-sensitive devices and larger form factor devices. Accordingly, this description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention.

What is claimed is:

1. A method, comprising:
    at a computer system having a processor operatively coupled to a memory and a touch interface, the touch interface comprising a virtual keyboard area in which taps of a touch object generate text input:
        detecting a swipe gesture across a plurality of keys on the virtual keyboard while the virtual keyboard is displayed, the swipe gesture including an initial touchdown point and a direction;
        determining the direction of the swipe gesture; and
        performing a predetermined function determined by the direction of the swipe gesture without regard to the initial touchdown point of the swipe gesture on the displayed virtual keyboard, wherein:
            a rightward swipe gesture invokes at least one of a space, an auto-completion, or display of an auto-completion menu without regard to an initial touchdown point of the rightward swipe gesture on the displayed virtual keyboard;
            a leftward swipe gesture invokes at least one of a character deletion, a word deletion, or a line deletion without regard to an initial touchdown point of the leftward swipe gesture on the displayed virtual keyboard;
            a downward swipe gesture invokes at least one of a carriage return, a new line, inserting punctuation, or an alternate keyboard without regard to an initial touchdown point of the downward swipe gesture on the displayed virtual keyboard; and
            an upward swipe gesture invokes at least one of a shift, a caps lock, or an alternate keyboard without regard to an initial touchdown point of the upward swipe gesture on the displayed virtual keyboard.

2. The method of claim 1, wherein the computer system is selected from the group consisting of a desktop computer, a tablet computer, and a notebook computer.

3. The method of claim 1, wherein the computer system comprises at least one of a handheld computer, a personal digital assistant, a media player, and a mobile telephone.

4. The method of claim 1, wherein the touch interface is a touch screen.

5. The method of claim 1, wherein detecting a swipe gesture across the virtual keyboard includes:
   acquiring touch image data from the touch-sensitive device;
   processing the image to generate one or more finger path events;
   determining a displacement of the one or more finger path events; and
   detecting a swipe gesture if the displacement exceeds a predetermined threshold.

6. The method of claim 5, wherein the computer system is selected from the group consisting of a desktop computer, a tablet computer, and a notebook computer.

7. The method of claim 5, wherein the computer system comprises at least one of a handheld computer, a personal digital assistant, a media player, and a mobile telephone.

8. The method of claim 5, wherein the touch interface is a touch screen.

9. The method of claim 1, wherein determining the direction of the swipe gesture includes:
   comparing a magnitude of a vertical displacement of the swipe gesture to a magnitude of a horizontal displacement of the swipe gesture; and
   determining a vertical direction for the swipe gesture if the vertical displacement is greater than the horizontal displacement; and
   determining a horizontal direction for the swipe gesture if the vertical displacement is less than the horizontal displacement.

10. The method of claim 9, wherein the computer system is selected from the group consisting of a desktop computer, a tablet computer, and a notebook computer.

11. The method of claim 9, wherein the computer system comprises at least one of a handheld computer, a personal digital assistant, a media player, and a mobile telephone.

12. The method of claim 9, wherein the touch interface is a touch screen.

13. The method of claim 1, wherein the predetermined function comprises at least one of spacing, erasing, or punctuation insertion.

14. The method of claim 13, wherein the computer system is selected from the group consisting of a desktop computer, a tablet computer, and a notebook computer.

15. The method of claim 13, wherein the computer system comprises at least one of a handheld computer, a personal digital assistant, a media player, and a mobile telephone.

16. The method of claim 13, wherein the touch interface is a touch screen.

* * * * *